P. C. RIEBE.
GAGE MECHANISM.
APPLICATION FILED APR. 28, 1915.
1,196,981.
Patented Sept. 5, 1916.
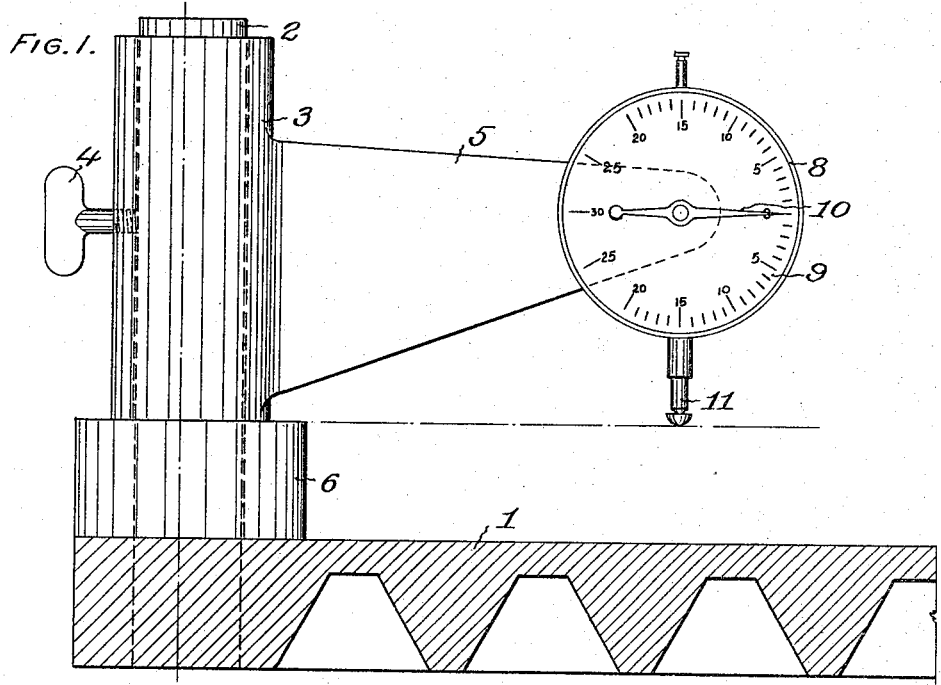
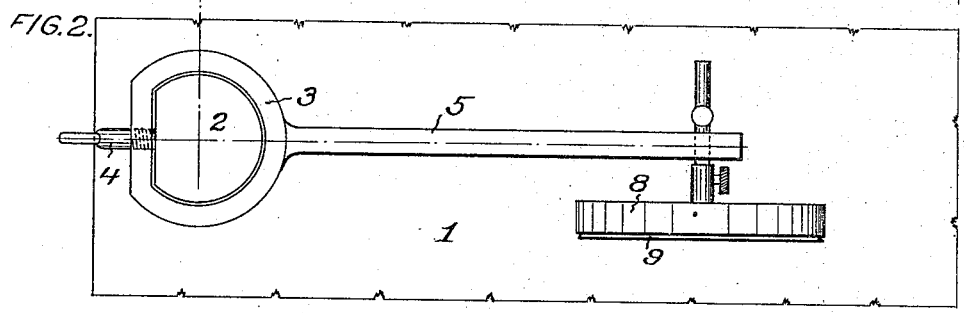
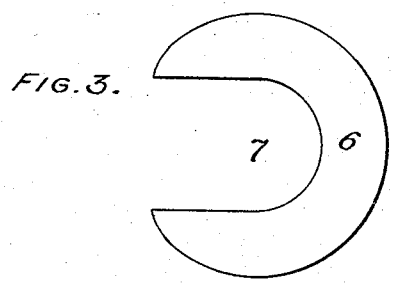
PAUL C. RIEBE, INVENTOR.
BY Robert Burns
ATTORNEY.

UNITED STATES PATENT OFFICE.

PAUL C. RIEBE, OF CHICAGO, ILLINOIS.

GAGE MECHANISM.

1,196,981.  Specification of Letters Patent.  Patented Sept. 5, 1916.

Application filed April 28, 1915. Serial No. 24,416.

*To all whom it may concern:*

Be it known that I, PAUL C. RIEBE, a citizen of the United States of America, and a resident of Chicago, in the county of Cook and State of Illinois, have invented certain new and useful Improvements in Gage Mechanisms, of which the following is a specification.

This invention relates to means for accurately and rapidly indicating or gaging the thickness of printing plates, electrotypes and the like, and has for its object to provide a simple and efficient structural formation and association of parts whereby any variation in the height or thickness of a printing plate or electrotype above or below a predetermined or standard height or thickness is attained and indicated in an accurate and rapid manner, all as will hereinafter more fully appear.

In the accompanying drawings:—Figure 1, is a side elevation with the supporting base in section, of a gage mechanism embodying the present invention. Fig. 2, is a detail plan view of the same. Fig. 3, is a plan view of a gage block detached.

Similar reference numerals indicate like parts in the several views.

Referring to the drawings, 1 designates a supporting base of a plate form and having its upper face formed plane and even to serve the purpose of an ordinary surface plate when so desired, and in the present improvement to support a printing plate or the like in proper manner while being gaged.

2 designates a vertical standard or post, fixedly secured to the base 1, near one end of the same, and in accurate right-angle relation to the top surface of said supporting base.

3 designates a sleeve bracket slidingly mounted on the vertical standard 2, and secured at the required vertical adjustment by means of a set-screw 4, or like equivalent fastening means. In the present structure the sleeve bracket 3 is provided with a lateral horizontally disposed bracket arm 5 adapted to carry the indicating mechanism, hereinafter described.

6 designates one of a series of standard gage blocks adapted for use in the present structure, and which are made of different standard heights to correspond with different standard thicknesses of printing plates. In the present improvement the proper gage block 6 will be interposed between the top surface of the supporting base 1, and the undersurface of the sleeve bracket 3, to attain the required elevation of the said sleeve bracket and the indicating mechanism mounted thereon. In the preferred form of said gage blocks 6 as shown in Figs. 1 and 3, the same will have a circular or disk shape and formed with an open-sided central recess 7 adapted to embrace the standard 2, and to be slipped laterally into place around the same.

8 designates the housing of the indicating mechanism, carried on the free end of the bracket arm 5, aforesaid, and provided with a dial 9, pointer 10 and a movable gage stem 11, which depends a distance below said housing 8 and is connected to the aforesaid pointer 10 by any suitable intermediate gearing or operative connections such as ordinarily employed in dial indicating devices, and the arrangement will be such that the aforesaid pointer 10 will be at the zero point of the dial 9, when a printing plate of the required standard thickness is beneath the gage stem 11.

In practical use, a standard gage block 6, of the requisite height is arranged in place, with the sleeve bracket 3 lowered to accurately rest thereon, and secured in position by the set-screw 4. The mechanism is then ready for use, so that by laterally sliding a printing plate or the like beneath the movable gage stem 11, while said printing plate is supported on the top face of the supporting base 1, an accurate indication of its excess or lack in thickness will be automatically attained on the dial 9, aforesaid.

Having thus fully described my said invention what I claim as new and desire to secure by Letters Patent, is:—

In a gage mechanism, the combination of a base plate having a plane top surface, a vertical standard fixedly associated with said base plate, a bracket member slidingly associated with said base plate and provided with a depending gage stem and dial and pointer operatively connected to said gage stem, and a gage block of a predetermined height interposed between the base plate and bracket member to impose separated relation between said base plate and bracket member, the said gage block having an open sided recess adapting it for ready application to the aforesaid vertical standard intermediate of said base plate and bracket member, substantially as set forth.

Signed at Chicago, Illinois, this 24th day of April, 1915.

PAUL C. RIEBE.

Copies of this patent may be obtained for five cents each, by addressing the "Commissioner of Patents, Washington, D. C."